April 23, 1935.  L. C. BRISSON  1,998,533
BRAKE
Filed Nov. 16, 1933   2 Sheets-Sheet 1

L. C. Brisson
INVENTOR

By: Marks & Clerk
Atty's.

April 23, 1935.  L. C. BRISSON  1,998,533
BRAKE
Filed Nov. 16, 1933  2 Sheets-Sheet 2

L. C. Brisson
INVENTOR

By: Marks & Clerk
ATTYS

Patented Apr. 23, 1935

1,998,533

UNITED STATES PATENT OFFICE 1,998,533

BRAKE

Louis Charles Brisson, Neuilly-sur-Seine, France, assignor to Société Anonyme: Société des Freins Hydrauliques S. de Lavaud, Paris, France Application November 16, 1933, Serial No. 698,353
In France November 17, 1932

13 Claims. (Cl. 188—106)

Brakes are already known comprising a drum, expansible braking means such as brake shoes for instance, and two entirely distinct devices for controlling these expansible braking means, one of these devices being of the hydraulic type and the other of the mechanical type.

Brakes of this kind have some inconveniences. The main inconvenience of said brakes consists in that the hydraulic device, on the one hand, and the mechanical device on the other hand, do not act at the same place on the brake shoes. Now, in many cases, and particularly in the case of self-applying brakes, the braking action is quite different according to the position of the point of application of the stresses spreading the brake shoes apart.

A first object of the invention is to avoid this inconvenience and to provide a brake of the type indicated in which the points of application on the brake shoes of the stresses spreading them apart are the same, whether these stresses are transmitted by the hydraulic device or by the mechanical device.

A second object of the invention is to provide a brake of the type indicated, in which the slack adjusting system operates in all cases, whether the stresses spreading the brake shoes apart are transmitted by the hydraulic device or by the mechanical device.

The accompanying drawings illustrate, by way of example only, a form of carrying the invention into practice.

Figure 2:
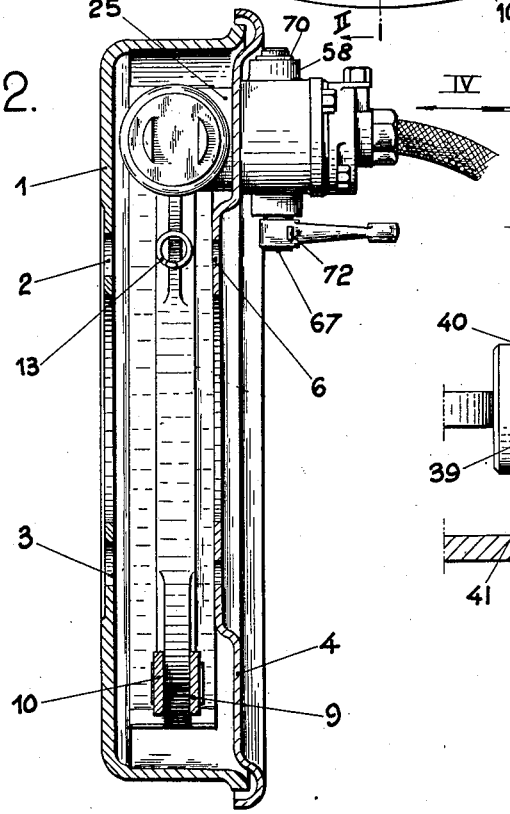
Fig. 2 is a side view corresponding to Fig. 1, with partial section made according to line II—II of Fig. 1.
Figure 5:
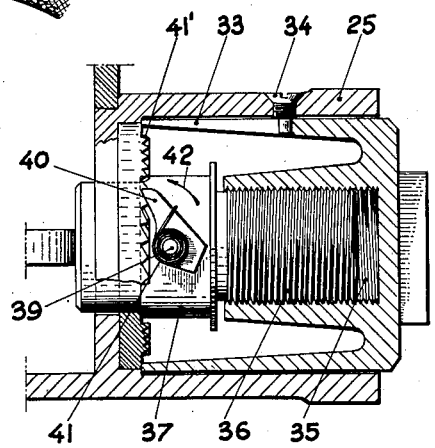
Fig. 5 is a partial sectional view made according to line V—V of Fig. 3.
Figure 3:
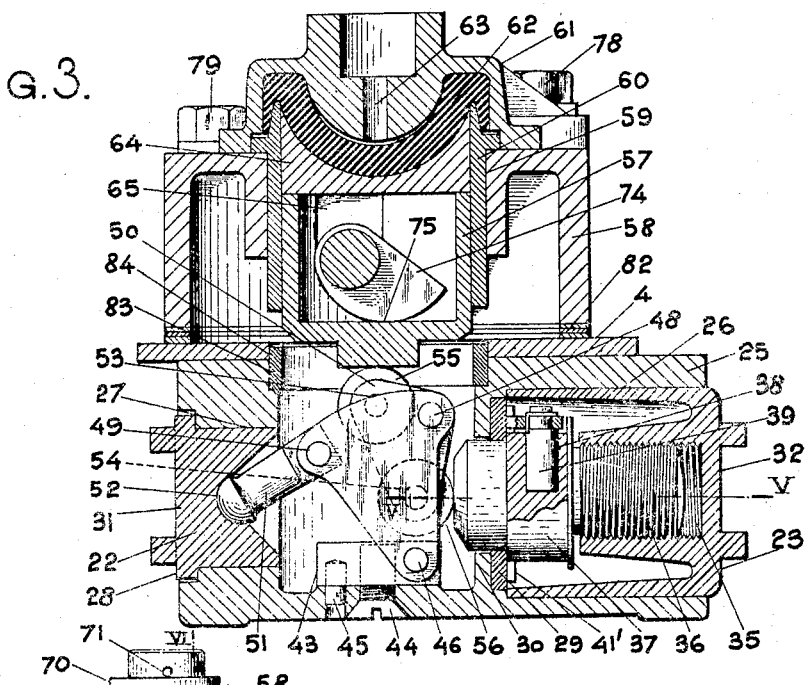
Fig. 3 is a sectional plan view made according to line III—III of Fig. 1, and on an enlarged scale.
Figure 4:
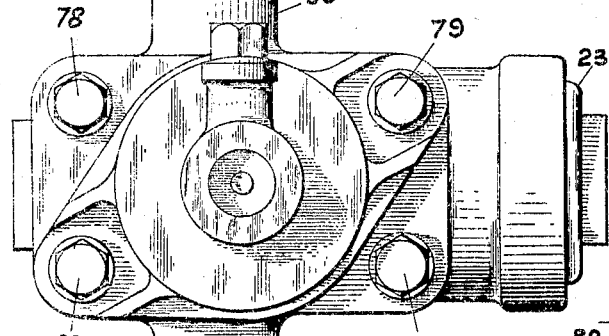
Fig. 4 is a partial rear elevation, according to the arrow IV of Fig. 2.
Figure 6:
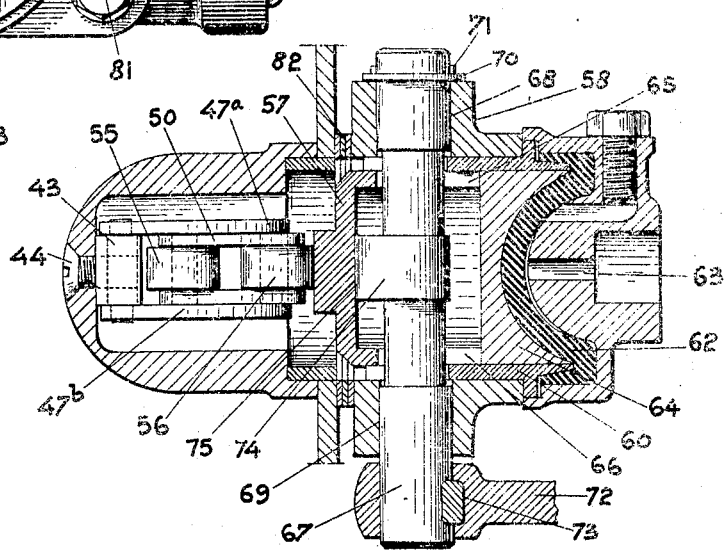
Fig. 6 is a sectional view made according to line VI—VI of Fig. 4.

The rotating drum is indicated at 1. In this example, the brake is assumed to be a brake for motor vehicles, although the invention is utilizable for any application. The drum 1 has therefore, in this example, the usual shape of the brake drums of motor cars, and it is adapted to be secured on a wheel by the usual means. These means have not been shown, and in Figs. 2 and 3 have simply been illustrated the holes provided in the drum 1 and through which can pass the bolts used for securing said drum to the wheel or to the wheel hub. 4 designates the fixed cheek member which is also common in the brakes of motor vehicles and ordinarily serves to support the brake control members and the brake shoes, and also to close the brake drum in order to avoid the entrance of mud and dust in the latter. The means for securing said cheek member have not been shown, and at 5 and 6, etc., there have simply been indicated the holes through which the securing bolts can pass.

The invention is applicable whatever may be the expansible braking means coming in engagement, upon braking, with the brake drum 1. In the example chosen, these expansible braking means are constituted by two brake shoes 7 and 8 connected together by links 9 and 10 which are pivoted to the lower end of the brake shoes at 11 and 12.

At the upper part, a spring 13, which enters holes 14 and 15 provided in lugs 16 and 17, constantly tends to move the brake shoes towards each other. The brake shoes 7 and 8 are provided with bearing members 18 and 19 made of harder metal, and secured in any manner whatever, for instance by means of rivets 20 and 21. These bearing members, as will be described hereinafter in greater detail, are adapted to come in contact with the pistons 22 and 23 of the actuating mechanism indicated at 24. In this arrangement, the surfaces of the pistons 22 and 23 on which bear the members 18 and 19 are plane, the pistons 22 and 23 are guided at right angles to the direction of these planes, that is to say parallel to the links 9 and 10. Consequently, all the reacting stresses exerted on the brake shoes 7 and 8 by the control member 24, by the links 9 and 10, and by the braking torque, have constant and parallel directions so as to obtain the advantages of the brake described in the United States patent application in the name of Dimitri Sensaud de Lavaud, Serial No. 408,125, filed November 18, 1929, for "Brakes for vehicles". But it must be once again clearly understood that the invention is applicable to any other brake device; in fact, it does not reside in the brake itself, but in the means for actuating the brake, as will now be seen.

The device 24, which is illustrated in detail in Figs. 3, 4, 5 and 6, is composed of a body 25 secured on the cheek member 4 within the brake drum. This body 25 is cylindrically bored according to two parallel geometrical axes at 26 and at 27. The piston 23 slides in the bore 26 and the piston 22 in the bore 27. The piston 22 is provided with a head 28 limiting its inward movement, whilst the piston 23 bears against an abutment 29 which presses upon an inner partition 30 of the body 25. The pistons 22 and 23 are thus therefore co-axially guided in a fixed direction. Their end surfaces 31 and 32 are at right angles to this guide direction, and the body 25 is so secured within the cheek member 4 that, this guide direction is parallel to the links 9 and 10.

The piston 23 is provided, at 33, with a longitudinal slot in which extends a guide member 34 secured on the body 25, by means of a screw for instance. The piston 23 can therefore slide but it cannot rotate. Besides, the piston 23 is axially perforated with a hole 35 which is screw-threaded for receiving the screw-threaded end 36 of a member 37. This member is perforated with a radial hole 38 within which fits a pivot 39 for a pawl 40. The pawl 40 cooperates with teeth 41' formed on the abutment member 29. This abutment member has been forcibly fitted in position, so as to be unable to rotate. A spring 41 always tends to cause the pawl 40 to rotate in the direction of the arrow 42. This arrangement provides the slack-adjusting device forming the subject-matter of the United States patent in the name of Dimitri Sensaud de Lavaud, numbered 1,971,643 and dated August 28, 1934, for "Automatic adjusting device".

A member 43 is secured within the body 25, for instance by means of a screw 44 and of an element 45 forcibly fitted in position. The member 43 carries, at 46, a pivot pin for a lever composed of two cheek members 41a, 47b, connected together for instance by means of two pins 48 and 49, one of which, 48, serves as a pivot for a bent lever 50, whilst the other, 49, serves as a pivot for a link 51 pivotally connected at 52 to the piston 22. The lever 50 carries, at 53 and 54, pivot pins for rollers 55 and 56, the roller 56 bearing on the end of the member 37, whilst the roller 55 bears on a thrust member 57 which will be described later on.

The device which has just been described is already known per se and does not form a part of the present invention. It is particularly described in a French patent filed by the Société des Freins Hydrauliques S. de Lavaud, on the 3rd November 1931 and bearing No. 741,131.

Outside the fixed cheek member 4 is secured a support 58. Said support is bored at 59 for receiving a bush 60. A cap 61 rests on the support 58 and bush 60, so as to enclose and to tightly and hermetically secure a thick rubber diaphragm 62, of hemispherical shape. The cap 61 is perforated at 63 with an orifice through which is admitted a hydraulic pressure generated in any manner whatever and which need not be described herein. Moreover, the use of a distortable rubber wall such as 62 is also already known. Under the action of the hydraulic pressure, this wall bulges and pushes a piston 64 which is in contact with the thrust member 57 by its periphery, as said thrust member 57 is hollow.

The member 57 is provided at 65 and 66 with longitudinal grooves through which passes a vertical shaft 67. This shaft 67 rotates in bearings 68 and 69 forming a part of the support 58. At its upper end, the shaft 67 is held from endwise movement by a washer 70 and a pin 71. At its lower part, the shaft 67 receives an operating lever 72 secured on the same by a key 73. Finally, within the hollow thrust member 57, the shaft 67 is provided with a cam 74 acting on the bottom of the member 57.

Preferably, the cam 74 is given the shape of an arc of evolvent, the evolute of which would be a circle having for center the axis of the shaft 67, and, moreover, said shaft 67 is so arranged that the contact between the cam 74 and the member 57 takes place at a point 75 which is situated on the geometrical axis of this cylindrical member 57. It is then obviously necessary that the axis of the shaft 67 should not meet the axis of the member 57; the distance between both these axes is the radius of the circle of which the cam 74 is an evolvent. In these conditions, it will be seen that the thrust exerted by the hydraulically actuated piston 64 and the thrust exerted by the mechanically actuated cam 74, have exactly the same direction, which is that of the axis of the member 57, and have also exactly the same effects, since the mechanical control and the hydraulic control both always axially act on the member 57. It is obvious that the actuation of the cam 74 by the shaft 67 has no effect on the hydraulic control; on the other hand, it is also obvious that the actuation of the hydraulic control has no effect on the mechanical control.

Figure 1:
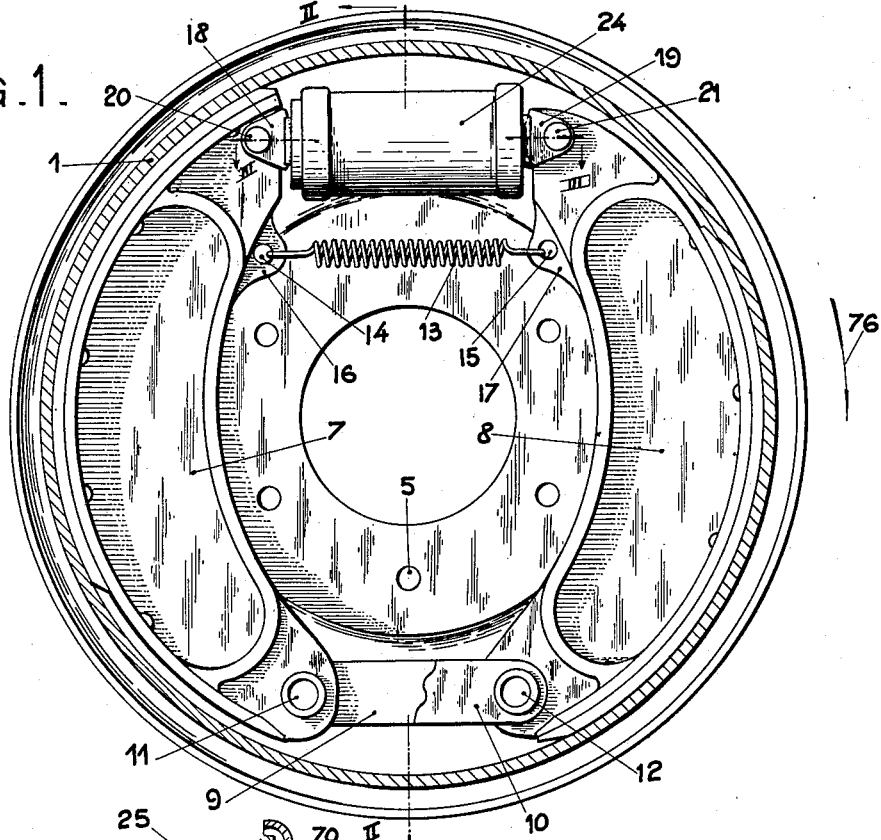
Fig. 1 is an elevation of the apparatus, and the brake drum is assumed to be sectioned.

The operation is as follows:

It will be assumed that the drum 1 rotates in the direction of the arrow 76 (Fig. 1) and that a hydraulic pressure is produced, which pressure, through the orifice 63, causes the thick diaphragm 62 to bulge. The piston 64 moves, and drives the member 57. This movement of the member 57 has no influence whatever on the mechanical control, since said member can freely slide owing to the grooves 65 and 66. The member 57 exerts a thrust on the roller 55, this tending to cause the lever 50 to rotate about the pivot pin 48.

The movement of the lever 50 can determine two movements. In fact, it will be assumed that the piston 22 is fixed, (it will be seen later on that it is indeed the case in the example under consideration). Then, the triangle 52, 49, 46, which has two fixed apices at 52 and at 46, also renders the apex 49 fixed. The lever 47a—47b cannot therefore move. The point 48 being fixed, the rotation of the lever 50 exerts a thrust on the member 37 and, consequently, on the piston 23. The piston pushes therefore the member 19, that is to say, the brake shoe 8 which moves away and presses against the wall of the brake drum. This brake shoe tends to be driven by the rotation of the drum 1, and this stress is transmitted, by the links 9 and 10, to the brake shoe 7. The latter bears upon the piston 22, and tends to cause it to enter the body 25 which is impossible owing to the abutment 28. The operation of this type of self-applying brake is well known and need not be further described.

Normally, the piston 23 must not move to an extent greater than the height of a tooth of the series of teeth. Consequently, in the normal case, during the movement of the piston 23, the pawl 40, held in contact with a tooth by the contact 42, slides on this tooth without leaving it. On the contrary, if the movement of the piston 23 is of greater amplitude, the pawl 40 moves away from the teeth and comes in engagement with the following tooth. When the piston 23 returns to its original position under the action of the returning spring 13, owing to the fact that the pawl 40 has come in engagement with the following tooth, its propping action on this tooth forces the member 37 to rotate. The rotation of the member 37 is such that it causes the screw 36 to unscrew relatively to the piston 23, so that the piston 28 does not return entirely to its initial position. Slack-adjustment has therefore taken place automatically. This operation is also known, since it is described in the United States patent application in the name of Dimitri Sensaud de Lavaud, Serial No. 422,662 filed on November 22, 1930.

If instead of acting on the hydraulic means, the lever 72 had been actuated by a linkwork (not shown), this lever by rotating would have exerted, through the cam 74, an axial thrust on the member 57 and the operation would have been identically the same. It will be noted, in particular, that slack-adjustment would have taken place identically in the same manner.

In case the drums rotate in reverse direction to the arrow 76, the piston 23 becomes fixed. At this moment, it is the pivot pin 54 which must be considered as movable, and it will then be seen that the thrust of the member 57 on the roller 55 pushes the piston 22 outwardly. This case is that of backward running, it is identical to the preceding case, with this difference, however, that the slack-adjusting device does not operate. It will operate upon the next application of the brake during forward running.

The entire set of members is secured in position by means of screws such as 78, 79, 80 and 81, these screws pass through the cap 61, body 58, cheek member 4, and screw into the body 25. A fluid-tight packing is provided at 82. The ring 83 which loosely fits on the body 25, serves to ensure the centering relatively to the hole 84 which is drilled in the cheek member 4 for allowing the passage of the member 57.

What I claim as my invention and desire to secure by Letters Patent is:

1. In a brake having a hydraulic control and a mechanical control, a rotating drum, expansible braking means, a thrust member, means for guiding the thrust member in a direction at right angles to the direction of expansion of the expansible braking means, means for transmitting to the expansible braking means the movement of said thrust member, hydraulic means and mechanical means arranged for separately acting on said thrust member.

2. In a brake having a hydraulic control and a mechanical control, a rotating drum, expansible braking means, a thrust member, means for guiding the thrust member in a direction at right angles to the direction of expansion of the expansible braking means, means for transmitting to the expansible braking means the movement of said thrust member, hydraulic means and mechanical means arranged for separately exerting a thrust, according to one and the same geometrical axis, on said thrust member.

3. In a brake having a hydraulic control and a mechanical control, a rotating drum, expansible braking means, a thrust member, means for guiding the thrust member in a direction at right angles to the direction of expansion of the expansible braking means, means comprising an automatic wear-compensating device, for transmitting to the expansible braking means the movement of said thrust member, hydraulic means and mechanical means arranged for separately acting on said thrust member.

4. In a brake having a hydraulic control and a mechanical control, a rotating drum, expansible braking means, a thrust member, means for guiding the thrust member in a direction at right angles to the direction of expansion of the expansible braking means, means comprising an automatic wear-compensating device, for transmitting to the expansible braking means the movement of said thrust member, hydraulic means and mechanical means arranged for separately exerting a thrust, according to one and the same geometrical axis, on said thrust member.

5. In a brake having a hydraulic control and a mechanical control, a rotating drum; brake shoes, a thrust member, pistons co-axially guided for acting on the ends of the brake shoes, means for transmitting to the pistons the movement of said thrust member, said means comprising an automatic wear-compensating device, hydraulic means and mechanical means arranged for separately acting on said thrust member.

6. In a brake having a hydraulic control and a mechanical control, a rotating drum, brake shoes, a thrust member, pistons co-axially guided for acting on the ends of the brake shoes, means for transmitting to the pistons the movement of said thrust member, said means comprising an automatic wear-compensating device, hydraulic means and mechanical means arranged for separately exerting a thrust, according to one and the same geometrical axis, on said thrust member.

7. In a brake having a hydraulic control and a mechanical control, a rotating drum, brake shoes, a thrust member, pistons co-axially guided for acting on the ends of the brake shoes, means for guiding the thrust member in a direction at right angles to the direction in which the pistons are guided, means for transmitting to the pistons the movement of said thrust member, said means comprising an automatic wear-compensating device, hydraulic means and mechanical means arranged for separately acting on said thrust member.

8. In a brake having a hydraulic control and a mechanical control, a rotating drum, expansible braking means, a thrust member, means for transmitting to the expansible braking means the movement of said thrust member, a hydraulically actuated piston arranged for acting on the periphery of the thrust member, means for exerting a mechanical thrust action on the central portion of the thrust member.

9. In a brake having a hydraulic control and a mechanical control, a rotating drum, expansible braking means, a hollow thrust member provided with at least one side opening, means for transmitting to the expansible braking means the movement of said thrust member, a hydraulically actuated piston arranged for acting on the periphery of the hollow thrust member, a shaft arranged for rotating under the action of a mechanical control and passing through the opening of the hollow thrust member, a cam secured on said shaft for exerting a thrust on the bottom of the hollow thrust member.

10. In a brake having a hydraulic control and a mechanical control, a rotating drum, expansible braking means, a thrust member, means for guiding the thrust member in a direction at right angles to the direction of expansion of the expansible braking means, means for transmitting to the expansible braking means the movement of said thrust member, a hydraulically actuated piston arranged for acting on the periphery of the thrust member, and means for exerting a mechanical thrust action on the central portion of the thrust member.

11. In a brake having a hydraulic control, and a mechanical control, a rotating drum, expansible braking means, a hollow thrust member provided with at least one side opening, means for guiding the thrust member in a direction at right angles to the direction of expansion of the expansible braking means, means for transmitting to the expansible braking means the movement of said thrust member, a hydraulically actuated piston arranged for acting on the periphery of the hollow thrust member, a shaft arranged for rotating under the action of a mechanical control and passing through the opening of the hollow thrust member, a cam secured on said shaft for exerting a thrust on the bottom of the hollow thrust member.

12. In a brake having a hydraulic control and a mechanical control, a rotating drum, brake shoes, a hollow thrust member provided with at least one side opening, pistons co-axially guided for acting on the ends of the brake shoes, means for guiding the thrust member in a direction at right angles to the direction in which the pistons are guided, means for transmitting to the pistons, the movement of said thrust member, said means comprising an automatic wear-compensating device, a hydraulically actuated piston arranged for acting on the periphery of the hollow thrust member, a shaft arranged for rotating under the action of a mechanical control and passing through the opening of the hollow thrust member, a cam secured on said shaft for exerting a thrust on the bottom of the hollow thrust member.

13. In a brake having a hydraulic control and a mechanical control, a rotating drum, expansible braking means free within the rotating drum, a thrust member, pistons co-axially guided for pressing upon the ends of the expansible braking means and having abutment heads cooperating with fixed abutments limiting the movement of the pistons towards each other, means for transmitting to the pistons the movement of said thrust member, a hydraulically actuated piston arranged for acting on the periphery of the thrust member, and means for exerting a mechanical thrust action on the central portion of the thrust member.

LOUIS CHARLES BRISSON.